United States Patent [19]
Warwick et al.

[11] Patent Number: 5,785,156
[45] Date of Patent: Jul. 28, 1998

[54] SLIDING BRAKE CALIPER SYSTEM

[75] Inventors: Edward Harry Warwick, Englewood; Kenneth Larry Baldwin, Beavercreek, both of Ohio

[73] Assignee: General Motors Corporation, Detroit, Mich.

[21] Appl. No.: 631,430

[22] Filed: Apr. 12, 1996

[51] Int. Cl.[6] .................................... F16D 65/14
[52] U.S. Cl. ........................ 188/73.44; 188/73.32; 277/212 FB
[58] Field of Search ................. 188/73.41, 73.42, 188/73.44, 73.32; 277/212 FB

[56] References Cited

U.S. PATENT DOCUMENTS 4,446,948 5/1984 Melinat ................. 188/73.35 X

Primary Examiner—Robert J. Oberleitner
Assistant Examiner—Pamela J. Lipka
Attorney, Agent, or Firm—Jeffrey A. Sedlar

[57] ABSTRACT

A slidable brake caliper system includes a retaining pin that is slip fit within a bore of a mounting bracket to slidably retain a caliper relative to the mounting bracket. A resilient cylindrical retaining support in combination with a resilient bushing and boot assembly support the retaining pin slidably within a bore of the mounting bracket. The caliper is clamped onto the retaining pin by a fastener assembly in a manner such that it is slidably retained relative to the mounting bracket to provide a clamping load to a pair of brake pad assemblies that are carried by the mounting bracket and are capable of applying a selective frictional force a rotating element. The caliper suspension system which includes the retaining pin provides a means for pivotably opening the caliper relative to the mounting bracket to replace the pads without complete removal of the retaining pins.

12 Claims, 2 Drawing Sheets

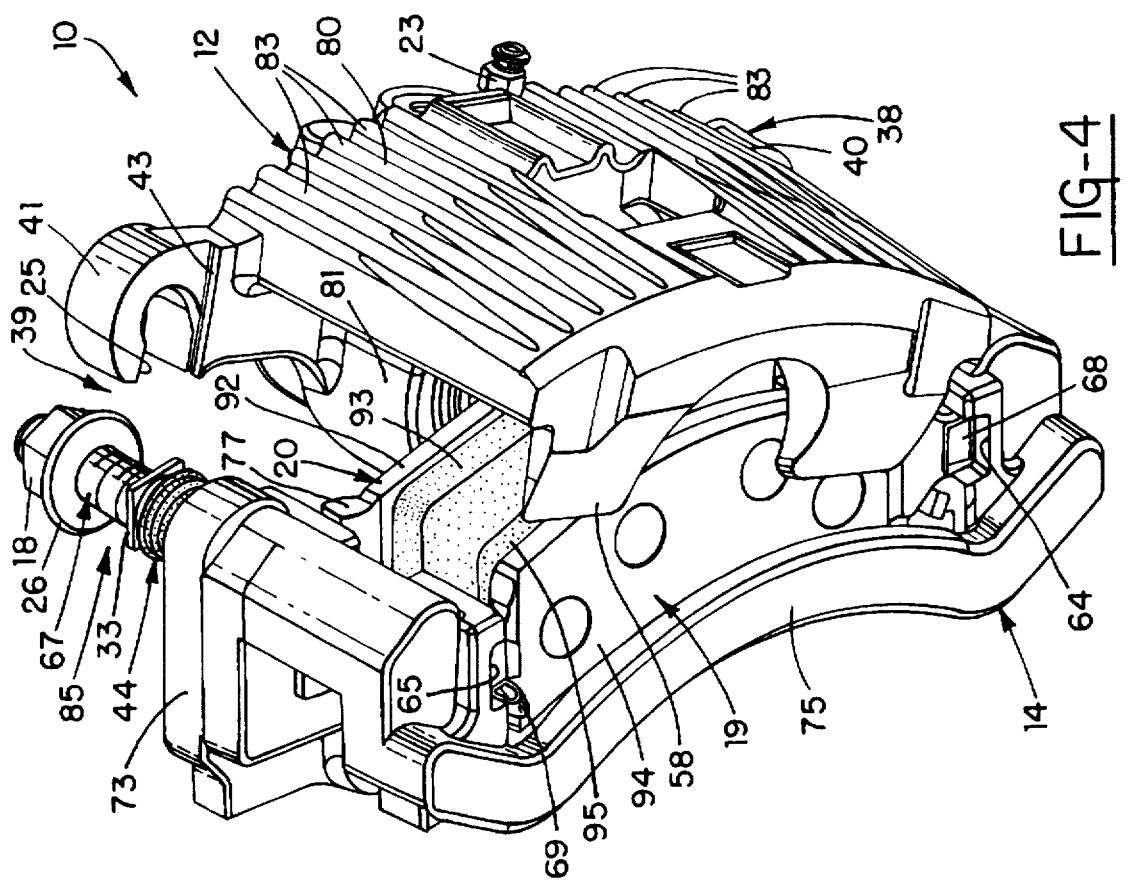
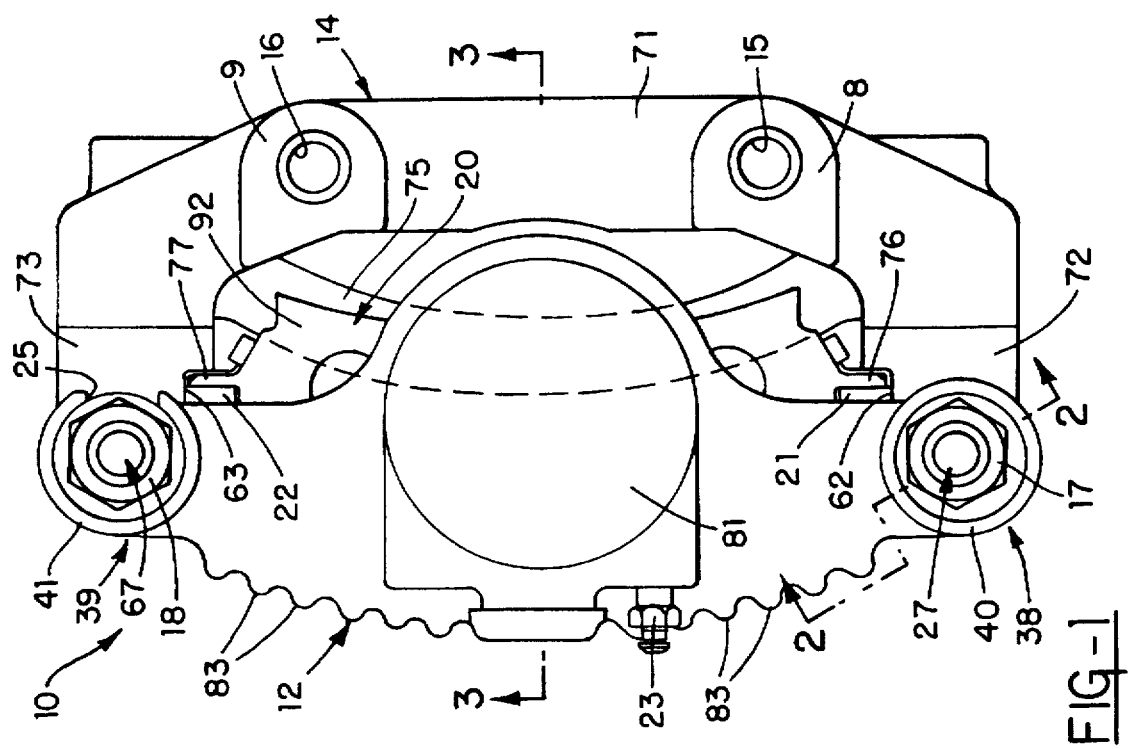

1

SLIDING BRAKE CALIPER SYSTEM

BACKGROUND OF THE INVENTION

The present invention relates to a sliding brake caliper system and more particularly, to a system wherein the brake caliper is mounted on pins and is slidable relative to a mating mounting bracket and relative to a rotating element such as a brake rotor or disk.

In general, sliding brake calipers are known wherein a fixed mounting bracket is provided relative to a rotating element, such as a rotor or disk, with a caliper slidably mounted on pins relative to the mounting bracket. With a typical sliding caliper assembly one or two pistons are generally incorporated in the caliper itself and a pair of shoe and lining assemblies are received within the caliper prior to its assembly onto the mounting bracket and rotating element. The caliper applies the clamping load to the shoe and lining assemblies to generate a selected amount of friction on the rotating element through operation of fluid or mechanical pressure on the piston. The caliper is slidable to compensation for such factors as lining wear and for rotating element deflection.

In general, the conventionally known sliding caliper assembly includes a retainer pin or bolt which is threaded into the caliper and extends through the mounting bracket. The pin is generally supported by inboard and outboard bushings carried by the caliper assembly to facilitate sliding movement thereof. When it becomes necessary to remove the caliper assembly from the mounting bracket, the conventional method of proceeding is to completely remove the retaining pins to enable removal of the caliper itself. The caliper, which carries the shoe and lining assemblies, is then removed from the mounting bracket to access the shoe and lining assemblies for removal and replacement. Care must be taken to ensure that contaminants are not introduced into the caliper suspension system which often includes the inboard and outboard support bushings, the retaining pin and an additional pin retaining sleeve. The removed parts are checked, cleaned and re-lubricated prior to reinstallation.

Once the shoe and lining assemblies are removed, replacement generally entails adding a new shoe retaining spring to the inboard assembly prior to reinstallation to ensure that the linings remain parallel to the rotating element during operation. An effect of the conventional sliding brake caliper assembly system is that brake shoe and lining assembly replacement tends to be somewhat time consuming. It would be preferable if the process time for the brake pad assembly replacement could be reduced.

SUMMARY OF THE INVENTION

It is an aim of the present invention to provide a brake caliper assembly structure and method of retaining and suspending a sliding caliper relative to its mounting bracket on the associated vehicle's chassis system in an effective and efficient manner. A system is provided such that during the shoe and lining assembly change process, the caliper suspension system remains sealed. Disassembly and complete removal of the retaining pins is not required. This eliminates the need to clean and re-lubricate the component parts and the factory sealed integrity is maintained.

According to a preferred embodiment of the present invention, the shoe and lining assembly removal process is also improved by the fact that the inboard and outboard pad assemblies are carried by the mounting bracket rather than the caliper. The caliper of this preferred embodiment is pivotably mounted so that it does not have to be completely removed from the mounting bracket for removal and replacement of the shoe and lining assemblies.

More specifically, the preferred embodiment of the present invention includes a mounting bracket fixedly mounted on a chassis element such as steering knuckle or an axle assembly bracket abutment. A pair of shoe and lining assemblies for applying a selective amount of friction to a rotating rotor or disk are preferably carried by the mounting bracket. A caliper is slidably carried on the mounting bracket for applying a clamping load to the shoe and lining assemblies.

The caliper preferably includes a pair of support arms with mounting openings. A suspension system slidably retains the caliper on the mounting bracket and about the shoe and lining assemblies. The suspension system includes a pair of retaining pins that are slidably supported in a pair of bores in the mounting bracket by at least one resilient component. Each retaining pin includes an annular shoulder and a threaded end such that the mounting openings of the support arms of the caliper are received against the shoulders and held on the threaded ends by a pair of nuts. This results in a structure wherein the caliper is slidable relative to the mounting bracket in coordination with the retaining pins.

According to a preferred aspect of the present invention, one of the mounting openings of the caliper support arms includes a U-shaped opening such that loosening of the associated nut is all that is required to pivot the caliper relative to the mounting bracket, exposing the shoe and lining assemblies for removal and replacement. The nut at the other end of the caliper does not need to be loosened at all. Through means of this aspect, the conventional steps in shoe and lining assembly removal and replacement of completely removing the retention pins and reassembling them into the system is eliminated.

BRIEF DESCRIPTION OF THE DRAWINGS

FIG. 1 is an elevation view of a sliding brake caliper system.

FIG. 4 is a perspective view of the sliding brake caliper system of FIG. 1 shown in a partially pivoted open position.

DETAILED DESCRIPTION OF THE PRESENTLY PREFERRED EMBODIMENT

Figure 2:
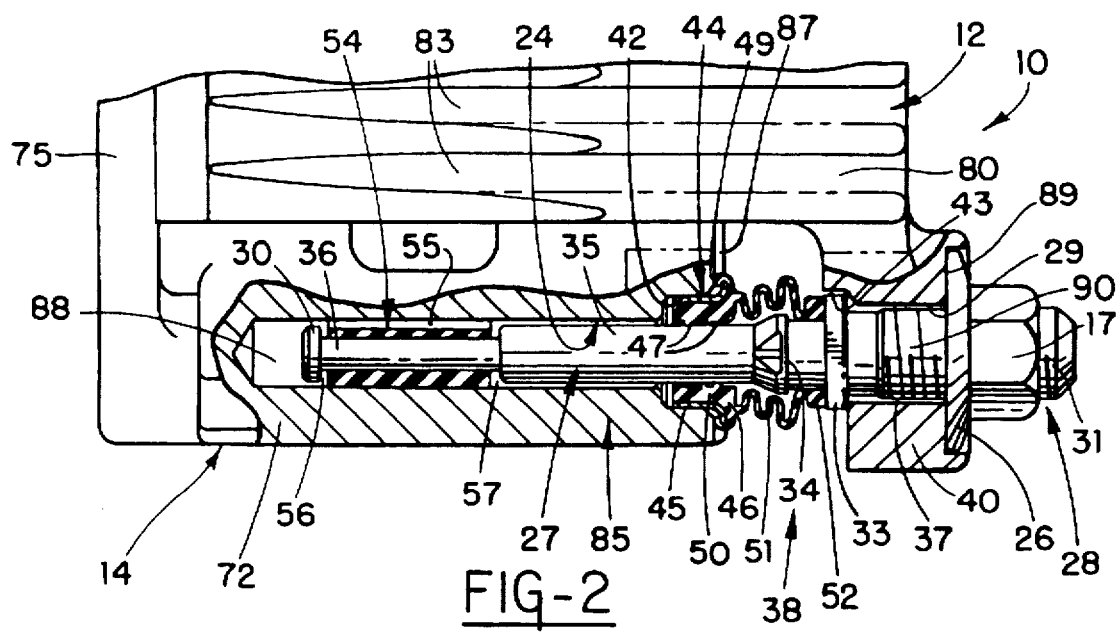
FIG. 2 is a fragmentary cross sectional illustration of the suspension system of the sliding brake caliper system of FIG. 1 taken generally through the plane indicated by the line 2—2 showing one of the two caliper to mounting bracket connections.

Referring to the drawings, illustrated in FIG. 1 is a sliding brake caliper assembly designated in the aggregate as 10. Sliding brake caliper assembly 10 includes a mounting bracket 14. Mounting bracket 14 is provided with mounting openings 15 and 16 with machined surfaces 8 and 9 formed thereabout. The mounting openings 15 and 16 provide a means for attaching the mounting bracket 14 in a fixed manner to a steering knuckle or to an axle assembly bracket of an associated vehicle (not illustrated). The machined surfaces 8 and 9 provide a means for locating the mounting bracket 14 on mating abutments which are provided on the steering knuckle or axle assembly bracket.

In general, the mounting bracket 14 includes a base element or body 71 which includes a pair of opposed arms 72 and 73. The body 71 and the arms 72 and 73 form a generally C-shaped configuration of the mounting bracket 14 that is designed to provide secure support. A structural element 75 is provided which extends substantially between the arms 72 and 73 to provide additional strength to the mounting bracket 14.

The mounting bracket 14 carries a pair of brake shoe and lining assemblies of which only one assembly is illustrated in the present Figure and is designated as pad assembly 20. The pad assembly 20 includes a pair of ears 76 and 77. The ears 76 and 77 each carry a retaining clip 21 and 22, respectively. The clips 21 and 22 facilitate the secure reception of ears 76 and 77 within the notches 62 and 63 respectively, that are provided in arms 72 and 73 of mounting bracket 14.

The mounting bracket 14 carries a caliper 12 on the arms 72 and 73. Caliper 12 includes a body 80 with an integral piston housing 81. A lower support arm 40 and an upper support arm 41 are integrally formed with the body 80. The caliper 12 also includes a bleed valve 23 and a plurality of cooling ribs 83.

A pivot connection 38 is provided at the lower support arm 40 providing a means of engagement between the mounting bracket 14 and the caliper 12. The pivot connection 38 includes a retaining pin 27 and a nut 17 which is threaded thereon. The upper support arm 41 forms part of a releasable connection 39 in combination with the arm 73 of mounting bracket 14 providing a second means of engagement between the mounting bracket 14 and the caliper 12. The releasable connection 39 includes a retaining pin 67 and a nut 18 which is threaded thereon. The upper support arm 41 includes a U-notch opening 25 which enables the upper support arm 41 to be releasably connected to the arm 73 of mounting bracket 14 so that the caliper 12 is rotatable about the pivot connection 38 relative to the mounting bracket 14 when the nut 18 is loosened.

Referring to FIG. 2, the details of pivot connection 38 are illustrated in cross section which reveals the caliper suspension system 85. The caliper suspension system 85 is substantially identical to the caliper suspension system provided at the releasable connection 39 with the exception that releasable connection 39 includes U-notch opening 25 whereas pivot connection 38 includes a circular bore 29. The two caliper suspension systems, including caliper suspension system 85, are provided to permit the caliper 12 to float in relation to the mounting bracket 14 to compensate for such factors as lining wear and rotor deflection.

In greater detail, the arm 72 of mounting bracket 14 includes a bore 24 which extends into the mounting bracket 14 from the inboard side 87. The bore 24 includes a counterbore section 42. A retaining pin 27 extends substantially through the bore 24 and exits from the inboard side 87 extending outwardly therefrom. The retaining pin 27 is suspended at two locations by a retaining support 54 and by a combination bushing and boot assembly 44.

The retaining support 54 is substantially cylindrical in shape and is formed of a resilient material. The retaining support 54 is therefore, expansible and slidable over the enlarged head 30 of retaining pin 27. Accordingly, the retaining support 54 is slidable onto the segment of reduced diameter, designated as reduced diameter sliding support segment 36, prior to insertion of the retaining pin 27 within the bore 24. With the retaining support 54 in position on the reduced diameter sliding support segment 36, the retaining pin is pressed into the bore 24 to the position illustrated. A longitudinal groove 55 is provided in the retaining support 54 to facilitate air escape from the chamber 88 during the assembly process.

The retaining support 54 is maintained in position within the bore 24 and the retaining pin 27 is permitted to slide relative thereto with the reduced diameter sliding support segment 36 moving within the retaining support 54. This is possible due to an amount of clearance provided by the spaces 56 and 57. The space 56, as illustrated, exists between the retaining support 54 and the enlarged head 30 of the retaining pin 27. The space 57, as illustrated, exists between the retaining support 54 and the sliding support segment 35 of retaining pin 27 which has a diameter larger than the reduced diameter sliding support segment 36. If necessary, the retaining support 54 slides within the bore 24 under the application of a sufficient force.

The sliding support segment 35 is supported by a combination bushing and boot assembly 44. Prior to the application of retaining support 54 to the retaining pin 27, the combination bushing and boot assembly 44 is slid onto the retaining pin 27. During the assembly process, when retaining support 54 is pressed into the bore 24 a predetermined distance, the bushing element 50 of combination bushing and boot assembly 44 is pressed into the counterbore 42.

The combination bushing and boot assembly 44 includes a resilient element 46 and, in the area of the bushing element 50, includes a metal insert 45 for structural support. The bushing element 50 includes an annular shoulder 49 which is received against the inboard side 87 of mounting bracket 14 and a plurality of annular ribs 47 which support the sliding support segment 35 of retaining pin 27.

The combination bushing and boot assembly 44 also includes a boot element 51 which is integrally formed as part of the resilient element 46 and extends from the bushing element 50. The boot element 51 includes a seal arm 52 which is sealingly secured between the square flange 33 of retaining pin 27 and shoulder 34 of retaining pin 27. The seal arm 52 closes the sliding elements of the caliper suspension system 85 in a manner that does not have to be opened during replacement of the pad assemblies carried by the sliding caliper assembly 10.

The caliper 12, by means of the lower support arm 40 is pivotably connected relative to the mounting bracket 14 at the caliper suspension system 85. More specifically, the mounting opening provided by circular bore 29 is received on the retaining pin 27. The caliper suspension system 85 includes a fastener assembly 28 which is formed by threaded segment 31 of retaining pin 27 and mating nut 17.

The square flange 33 of retaining pin 27 is received against surface 43 of caliper 12 and the nut 17 includes a flange 26 which is received against surface 89 of caliper 12. An amount of clearance 37 is provided between the inside of circular bore 29 and the segment 90 of retaining pin 27. As the nut 17 is tightened onto the threaded segment 31 of retaining pin 27, the segment 90 is drawn in tension between the square flange 33 and the flange 26 of nut 17. This provides for an amount of stretch of the segment 90 as the nut 17 is torqued, which helps retain a clamping load to prevent backing off of the nut 17 from the threaded segment 31. By incorporating the clearance 37 in the caliper 12 normal locating tolerances are provided for in the caliper suspension system 85 itself.

The caliper 12 is therefore, clamped by the nut 17 to the retaining pin 27. The retaining pin 27 is slidably maintained in the bore 24 of mounting bracket 14 by the retaining support 54 and the bushing element 50. Therefore, the caliper 12 is supported on the mounting bracket 14 by the caliper suspension system 85 in a slidable and floating fashion with help from the resiliency of the retaining support 54 and the bushing element 50. The caliper 12 is also rotatable through means of the caliper suspension system 85 when the releasable connection 39 is loosened without loosening of the nut 17.

Suspension of the retaining pins 27 and 67 in a combination of resilient elements, (retaining support 54 and resilient element 46), cushions the assembly. Impacts from wheel bumps and vibrations caused by brake applications and other vehicular borne sources are damped by the resilient components. This helps suppress noise transmission between the mounting bracket 14 and the caliper 12.

Figure 3:
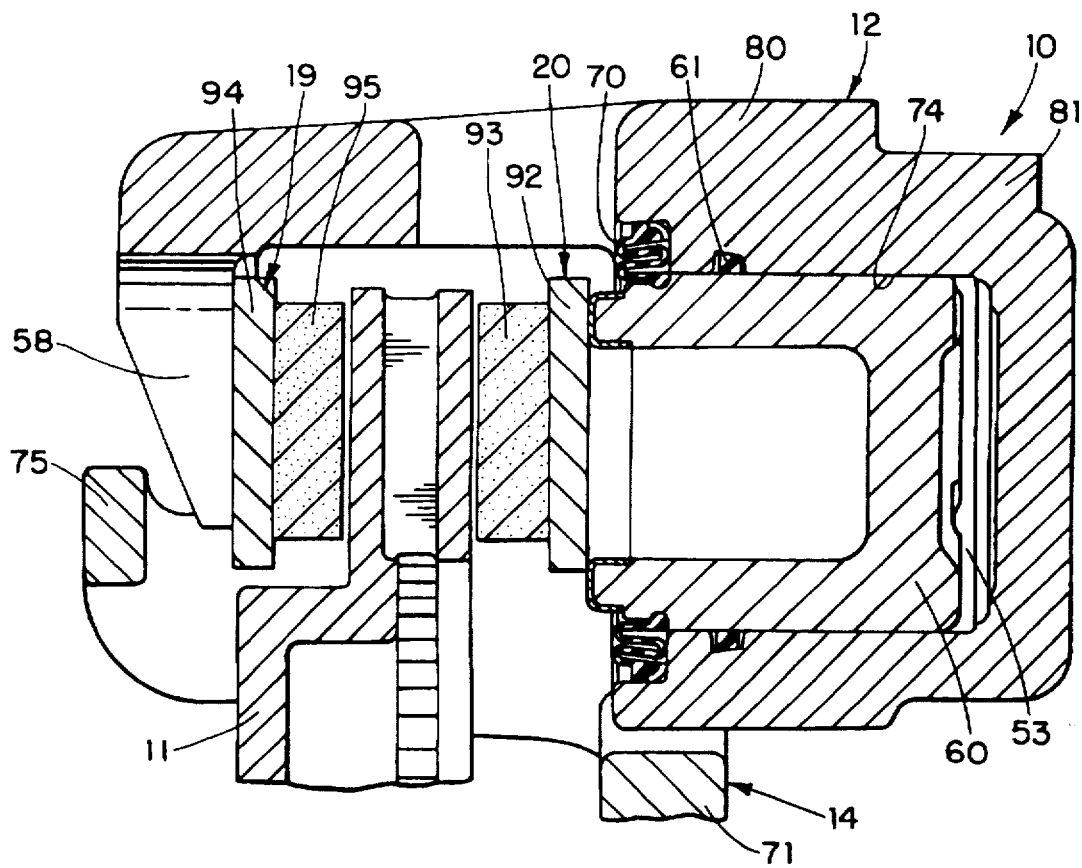
FIG. 3 is a fragmentary cross sectional illustration taken generally through the plane indicated by line 3—3 in FIG. 1.

Referring to FIG. 3, the sliding brake caliper assembly 10 is illustrated in cross section through the piston housing 81. The caliper 12 includes sliding piston 60 which is received within bore 74 with a boot 70 provided between the caliper 12 and the piston 60 and a seal 61 separating off a fluid chamber 53 within the bore 74. The piston 60 engages pad assembly 20 which includes metal shoe 92 and lining 93 made of an acceptable friction material.

The caliper 12 extends around rotor 11 with caliper arm 58 engaging pad assembly 19. Pad assembly 19 similarly includes shoe 94 and lining 95. During braking operation the linings 93 and 95 are forced against turnable rotor 11 as fluid pressure is increased in fluid chamber 53 forcing the piston 60 outward from the bore 74. In response, the caliper 12 floats or slides relative to the mounting bracket 14 to compensate for wear of the linings 93 and 95 or for deflection as the rotor 11 turns. The caliper suspension systems including caliper suspension system 85 are lubricated to minimize caliper slide forces.

Referring to FIG. 4, the sliding brake caliper system 10 is illustrated in perspective, with the caliper 12 in a partially pivoted open position relative to the mounting bracket 14. To enable rotation of the caliper 12 relative to the mounting bracket 14, the nut 18 is loosened. It is not necessary to loosen nut 17, (illustrated in FIG. 1), to effect rotation of the caliper 12 relative to the mounting bracket 14. Further, the nut 18 need only be loosened and not fully removed to enable rotation of the caliper 12 about pivot connection 38. The nut 18 is backed out sufficiently so that the flange 26 clears the upper support arm 41 to enable opening of the releasable connection 39. The U-notched opening 25 of the upper support arm 41 permits pivoting of the caliper 12 when the nut 18 is sufficiently loosened.

The piston 60, and the caliper arms 58 and 59 which apply the clamping load to pad assemblies 19 and 20 during braking action, rotate with the caliper away from the mounting bracket 14 exposing the pad assemblies 19 and 20 for removal and replacement. It can be seen that the pad assembly 19 is carried in notches 64 and 65 of the mounting bracket 14 by retaining clips 68 and 69. When the caliper 12 is sufficiently pivoted outward from the mounting bracket 14, the pad assemblies 19 and 20 are removed from their respective notches in the mounting bracket 14 for replacement.

During replacement of the pad assemblies 19 and 20, the combination bushing and boot assembly 44 of the caliper suspension system 85, which is provided at the pivot connection 38, and the releasable connection 39 maintains the sliding elements of the suspension system 85 in a sealed condition. The retaining pins 27 and 67 of the sliding brake caliper system 10 are maintained in a sealed condition within the mounting bracket 14. Therefore, the component parts of the caliper suspension system 85 do not need to be removed, cleaned and lubricated in order to change the pad assemblies 19 and 20.

When the pad assemblies 19 and 20 are replaced, the caliper 12 is pivoted back into full engagement with the mounting bracket 14. The only other step that is necessary to complete reassembly of the caliper assembly 10 is tightening of the nut 18.

Through means of the present invention a sliding brake caliper system provides a manner of retaining and suspending a floating disc brake caliper relative to its mating mounting bracket. The preferred embodiment includes two suspension systems with one located at each end of the assembly. This results in an assembly that facilitates pad change and therefore, reduces the process time of changing brake pads.

What is claimed is:

1. A sliding brake caliper system comprising:

a mounting bracket including a pair of bores;

a pair of pad assemblies;

a caliper slidably carried on the mounting bracket for applying a clamping load to the pad assemblies, the caliper including a pair of support arms, each with a mounting opening;

a pair of suspension systems slidably retaining the caliper on the mounting bracket each suspension system including a retaining pin slidably supported in one of the bores of the mounting bracket by a resilient cylindrical retaining support wherein the retaining pin includes a shoulder and a threaded end such that one of the mounting openings of the caliper support arms is received against the shoulder and held on the threaded end by a nut so that the caliper is slidable relative to the mounting bracket in coordination with the retaining pins wherein the caliper is rotatable relative to the mounting bracket by loosening only one of the nuts with the corresponding retaining pin remaining in place within the corresponding bore.

2. A sliding brake caliper system according to claim 1 wherein the suspension systems each include a resilient bushing slidably supporting the retaining pins in the bores in cooperation with the resilient cylindrical retaining supports.

3. A sliding brake caliper system according to claim 2 wherein the resilient bushings each include a boot formed with the bushings and engaging the retaining pins to seal closed the suspension systems.

4. A sliding brake caliper system according to claim 3 wherein the retaining pins each include an enlarged head and a first sliding support segment with a reduced diameter sliding support segment extending between the enlarged head and the first sliding support segment wherein the first sliding support segments are supported by the resilient bushings and the reduced diameter sliding support segments are supported by the resilient cylindrical retaining supports.

5. A sliding brake caliper system comprising:

a mounting bracket including a bore;

a pair of pad assemblies carried by the mounting bracket;

a caliper slidably carried on the mounting bracket for applying a clamping load to the pad assemblies, the caliper including a support arm with a mounting open;

a suspension system slidably retaining the caliper on the mounting bracket including a retaining pin slidably supported in the bore of the mounting bracket by a resilient cylindrical retaining support wherein the retaining pin includes a shoulder and a threaded end such that the mounting opening of the caliper support arm is received against the shoulder and held on the threaded end by a nut so that the caliper is slidable relative to the mounting bracket in coordination with the retaining pin.

6. A sliding brake caliper system according to claim 5 wherein the suspension system includes a resilient bushing slidably supporting the retaining pin in the bore in cooperation with the resilient cylindrical retaining support.

7. A sliding brake caliper system according to claim 6 wherein the resilient bushing includes a boot formed with the bushing and engaging the retaining pin to seal closed the suspension system.

8. A sliding brake caliper system according to claim 7 wherein the retaining pin includes an enlarged head and a first sliding support segment with a reduced diameter sliding support segment extending between the enlarged head and the first sliding support segment wherein the first sliding support segment is supported by the resilient bushing and the reduced diameter sliding support segment is supported by the resilient cylindrical retaining support.

9. A sliding brake caliper system comprising:

a mounting bracket including a bore;

a caliper slidably carried on the mounting bracket, the caliper including a support arm with a mounting opening;

a suspension system slidably retaining the caliper on the mounting bracket including a retaining pin slidably supported in the bore of the mounting bracket by a resilient cylindrical retaining support wherein the retaining pin is fastened to the caliper support arm at the mounting opening so that the caliper is slidable relative to the mounting bracket in coordination with the retaining pin;

wherein the suspension system includes a resilient bushing slidably supporting the retaining pin in the bore in cooperation with the resilient cylindrical retaining support;

wherein the resilient cylindrical retaining support includes a longitudinal groove in an outer peripheral surface of the resilient cylindrical retaining support, providing an air passage from the bore during assembly.

10. A sliding brake caliper system comprising:

a mounting bracket including a bore;

a caliper slidably carried on the mounting bracket, the caliper including a support arm with a mounting opening, wherein a step forms a flat surface in the support arm adjacent the mounting opening;

a suspension system slidably retaining the caliper on the mounting bracket including a retaining pin slidably supported in the bore of the mounting bracket by a resilient cylindrical retaining support wherein the retaining pin includes a square flange with a flat edge, wherein the square flange is adjacent a threaded end such that the mounting opening of the caliper support arm is received against the square flange with the flat edge is positioned against the flat surface of the caliper with the support arm held at the threaded end by a nut so that the caliper is slidable relative to the mounting bracket in coordination with the retaining pin; and a resilient bushing slidably supporting the retaining pin in the bore in cooperation with the resilient cylindrical retaining support, wherein the resilient bushing includes a boot formed with the bushing and including a seal arm engaging the retaining pin between the square flange and a shoulder formed by the retaining pin to seal closed the suspension system.

11. A sliding brake caliper system according to claim 10 wherein the resilient cylindrical retaining support includes a longitudinal groove in an outer peripheral surface of the resilient cylindrical retaining support, providing an air passage from the bore during assembly.

12. A sliding brake caliper system according to claim 11 wherein the mounting opening is U-shaped so that the caliper is rotatable relative to the mounting bracket by loosening the nut while the retaining pin remains in position within the bore.

* * * * *